US010916022B2

(12) United States Patent
Shi et al.

(10) Patent No.: US 10,916,022 B2
(45) Date of Patent: Feb. 9, 2021

(54) TEXTURE SYNTHESIS METHOD, AND DEVICE FOR SAME

(71) Applicant: SHENZHEN INSTITUTES OF ADVANCED TECHNOLOGY CHINESE ACADEMY OF SCIENCES, Shenzhen (CN)

(72) Inventors: Huajie Shi, Shenzhen (CN); Yang Zhou, Shenzhen (CN); Hui Huang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 65 days.

(21) Appl. No.: 16/487,087

(22) PCT Filed: Mar. 27, 2017

(86) PCT No.: PCT/CN2017/078248
§ 371 (c)(1),
(2) Date: Aug. 19, 2019

(87) PCT Pub. No.: WO2018/176185
PCT Pub. Date: Oct. 4, 2018

(65) Prior Publication Data
US 2019/0370987 A1 Dec. 5, 2019

(51) Int. Cl.
*G06T 7/44* (2017.01)
*G06T 7/12* (2017.01)
(Continued)

(52) U.S. Cl.
CPC .............. *G06T 7/44* (2017.01); *G06T 7/12* (2017.01); *G06T 7/13* (2017.01); *G06T 11/001* (2013.01); *G06T 11/40* (2013.01)

(58) Field of Classification Search
CPC . G06T 7/44; G06T 7/13; G06T 11/001; G06T 7/12; G06T 11/40
See application file for complete search history.

(56) References Cited

U.S. PATENT DOCUMENTS

| 10,816,981 B2 * | 10/2020 | Hazard | G06N 20/00 |
| 2011/0292064 A1 | 12/2011 | Wei et al. | |

(Continued)

FOREIGN PATENT DOCUMENTS

| CN | 102324102 A | 1/2012 |
| CN | 102426708 A | 4/2012 |

(Continued)

OTHER PUBLICATIONS

International Search Report issued in corresponding International application PCT/CN2017/078248, dated Jan. 4, 2018.

*Primary Examiner* — Yu Chen

(57) ABSTRACT

Disclosed are a texture synthesis method and a device using the same. The texture synthesis method adopts a source labeled diagram and a target labeled diagram in combination to guide the texture synthesis process, so that the texture synthesis is in a controlled state, thus effectively improving the accuracy and efficiency of the computer in processing complex texture information such as textures composed of multiple materials or textures involving non-uniform gradients. Meanwhile, determination of the accuracy of the texture features of the labeled diagram is introduced to the process of producing the labeled diagram, and the labeled diagram with low accuracy is re-abstracted and -segmented so that the classification of the texture features would be more accurate. This interactive iterative method improves the accuracy of the labeled diagram generation process. The device using this method also provides the same technical effects.

10 Claims, 6 Drawing Sheets

(51) Int. Cl.
  *G06T 7/13*   (2017.01)
  *G06T 11/00*  (2006.01)
  *G06T 11/40*  (2006.01)

(56) References Cited

U.S. PATENT DOCUMENTS

| | | | |
|---|---|---|---|
| 2013/0321574 A1* | 12/2013 | Zhang | H04N 19/172 |
| | | | 348/43 |
| 2014/0301649 A1* | 10/2014 | Zhang | H04N 19/172 |
| | | | 382/199 |
| 2015/0363906 A1* | 12/2015 | Huang | G06T 3/0081 |
| | | | 382/254 |
| 2016/0117834 A1* | 4/2016 | Wang | G06T 7/13 |
| | | | 382/173 |
| 2018/0122137 A1* | 5/2018 | Tian | G06T 7/521 |
| 2018/0130186 A1* | 5/2018 | Romanenko | G06K 9/4628 |
| 2019/0228571 A1* | 7/2019 | Atsmon | G06T 19/006 |

FOREIGN PATENT DOCUMENTS

| | | |
|---|---|---|
| CN | 102521869 A | 6/2012 |
| CN | 103839271 A | 6/2014 |

* cited by examiner

TEXTURE SYNTHESIS METHOD, AND DEVICE FOR SAME

CROSS REFERENCE TO RELATED APPLICATIONS

This application is the U.S. National Stage of co-pending International Patent Application No. PCT/CN20171/078248, entitled "Texture Synthesis Method. and Device for the Same" and filed on Mar. 27, 2017, which is hereby incorporated herein by reference in its entirety.

TECHNICAL FIELD

The present disclosure relates to the field of graphics and image processing, and more particularly relates to a texture synthesis method and a device for the same.

BACKGROUND

With the advancement of computer graphics and graphics processing technology, texture synthesis is growingly applied in computer image processing. Texture synthesis technology is designed to synthesize texture images that meet people's requirements using computer. It has a wide range of applications in both realistic and non-photorealistic texture rendering and filling. Meanwhile, it has broad application prospects in image restoration, image art style conversion, fast transmission of network compressed data, computer animation, and so on.

Sample-based texture synthesis can produce good results in many cases. However, when the original image contains structural information, or is composed of multiple materials, or has complex textures such as non-uniform gradients, the current sample-based texture synthesis technology cannot well synthesize texture images in absence of control. More importantly, the automatically synthesized results are not able to well meet the users' specific needs.

SUMMARY

One primary technical problem to be solved by the present disclosure is to provide a texture synthesis method and a device for the same which are easy to control in a texture synthesis process.

In order to solve the above technical problem, a technical solution adopted by the present disclosure is to provide a texture synthesis method, which includes the following sequential steps:

s1. abstracting a material texture in an original image, and analyzing a texture feature of the material texture;

s2. extracting a feature vector of the texture feature, and separately labeling different material textures;

s3. selecting the corresponding texture features of labeled areas in the original image to train a prediction algorithm;

s4. predicting unlabeled areas using the trained prediction algorithm, and creating a labeled diagram according to the predicted texture feature distribution;

s5. determining whether the texture feature distribution of the labeled diagram is accurate, if it is accurate, performing step s6; if it is not accurate, returning to step s3; and s6. obtaining a target texture image by synthesizing with a preset target labeled diagram based on the labeled diagram.

The step s2 may specifically include the following steps:

s21. extracting a color histogram of the texture feature, represented by a histogram;

s22. extracting filter group response information of the texture feature, represented by a histogram;

s23. extracting edge information of the texture feature, represented by a histogram;

s24. connecting the histograms of the above steps to obtain the feature vector; and s25. labeling the different material textures depending on the difference between the texture features.

The step s3 may specifically include the following steps:

s31. regarding the labeled material texture as a seed point;

s32. selecting the labeled area corresponding to the seed point to form a training set; and s33. extracting the texture features in the training set to train a random forest model.

The step s4 may include the following steps:

s41. predicting the unlabeled areas using the random forest model; and s42. optimizing the predicted preliminary labeled diagram using Graph cut model and generating the labeled diagram.

The step s5 may further include the following step:

s51. in response to determining that the texture feature distribution of the labeled diagram is inaccurate, relabeling the material textures and returning to step s3.

The target labeled diagram in step s6 may include the texture distribution information of the target texture image.

The step s6 may include the following steps:

s61. adding the labeled diagram and the target labeled diagram to an additional channel; and s62. generating the target texture image by using a self-adjusting texture optimization method.

The step s6 may further include the following step:

s63. performing weighted optimization on edges of the target texture image by using a distance offset map.

In order to solve the above technical problem, the present disclosure further includes a texture synthesis device, including:

a labeled diagram generating unit configured to abstract and analyze an input original image to extract a feature vector of a texture feature, separately label different material textures, select the texture features of labeled areas to train a prediction algorithm and predict unlabeled areas, and finally create a labeled diagram according to the texture feature distribution;

a feature determining unit coupled to the labeled diagram generating unit and configured to determine whether the texture feature distribution of the labeled diagram is accurate; if it is not accurate, the material textures are relabeled and the labeled diagram generating unit is activated to retrain the prediction algorithm to generate the labeled diagram; and a synthesizing unit coupled to the labeled diagram generating unit and configured to synthesize the labeled diagram with a preset target labeled diagram based on the labeled diagram to obtain a target texture image.

The labeled diagram generating unit may include:

a color module configured to extract a color histogram of the area, the color histogram being represented by a histogram;

a filter group response information module configured to extract filter group response information of the area, the filter group response information being represented by a histogram;

an edge information module configured to extract edge information of the area, the edge information being represented by a histogram;

the synthesizing unit may include:

an additional channel configured to load the labeled diagram and the target labeled diagram; and a texture boundary optimizing module configured to separately extract a distance offset map according to each of the label map and the target label map, and perform weighted optimization on the edges of the target texture image according to the extracted distance offset maps.

The present disclosure provides the following beneficial effects. Compared with the related art, in the texture synthesis process according to the present disclosure, the original image is abstracted to obtain the texture features of its material textures, and the original image is labeled depending on the different texture features, and a trainable prediction algorithm is used to classify the original image before obtaining the labeled diagram of this original image through a Graph cut model. Further, it is determined whether the labeled diagram is accurate. If the labeled diagram is not fitting, the above steps would be repeated until the labeled diagram is able to accurately reflect the distribution of different material textures in the original image. Finally, a new texture image is synthesized under the guidance of the target labeled diagram. By way of the determination whether the labeled diagram is accurate and the iterative operations when the labeled diagram is inaccurate, the quality of the texture synthesis can be effectively controlled, so that the final synthesized texture is controllable and meets the requirements, thereby effectively saving labor costs, providing a high efficiency and controllability of quality of texture synthesis. The device implementing the above method also provides the same technical effects.

BRIEF DESCRIPTION OF THE ACCOMPANYING DRAWINGS

DETAILED DESCRIPTION OF ILLUSTRATIVE EMBODIMENTS

A texture synthesis method and a device using the same that are provided by the present disclosure will now be described in detail below in connection with FIGS. 1 through 14.

Figure 1:
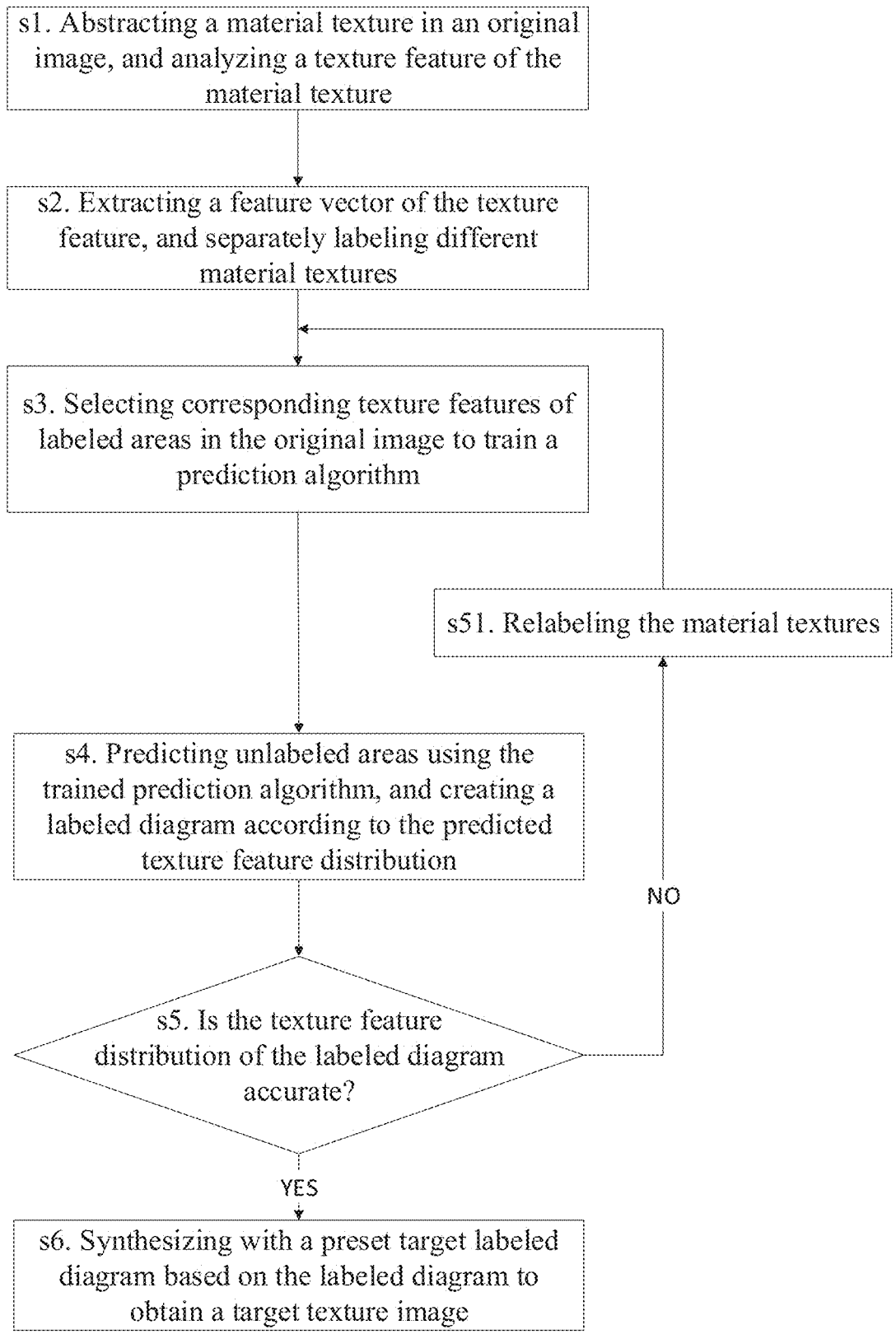
FIG. 1 is a flow chart illustrating basic steps of a texture synthesis method in accordance with the present disclosure.

As illustrated in FIG. 1, the texture synthesis method includes the following sequential steps that begin with s1.

In s1, a material texture in an original image is abstracted, and a texture feature of the material texture is analyzed.

In this step, the abstracting operation on the material texture is essentially to analyze the material texture and extract the corresponding texture feature, so that the material texture can be recognized and classified by computer.

In s2, a feature vector of the texture feature is extracted, and different material textures are separately labeled.

For an intuitive illustration, this step consists in that the multiple original small pixels are regarded as one logical pixel, and each logical pixel of the original image is subjected to feature extraction, where the features extracted are namely the three features described below, including a color histogram, filter group response information, and edge information. Each logical pixel may have a feature vector representation. Meanwhile, labeling the areas of different material textures can facilitate the subsequent training of the prediction algorithm and determination of whether the generated labeled diagram is accurate.

In the actual operation of labeling the material textures of the original image, the original image is typically used as the background, and different colors or numbers may be labeled in the corresponding areas depending on different material textures, so as to establish associations between the texture features of the material textures and the corresponding labels.

Figure 5:
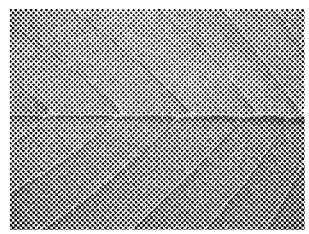
FIG. 5 shows an original image that is input when performing the texture synthesis method in accordance with the present disclosure.
Figure 9:
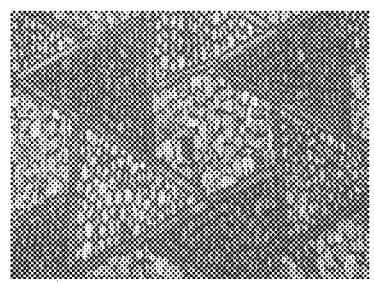
FIG. 9 shows an original image that is input when performing the texture synthesis method in accordance with the present disclosure.

In the actual operation, this embodiment may use SLIC (Simple Linear Iterative Clustering) algorithm to divide the original image (as illustrated in FIG. 5 or FIG. 9) into a plurality of uniform Super Pixel blocks, and the texture features of each pixel block are counted. A super-pixel block generally means dividing an image that is originally pixel-level into a district-level image. From these areas, it is convenient to extract effective basic information such as a color histogram, texture information, and so on. Advantages of using superpixels are that on the one hand, the number of sample points is reduced thereby accelerating the algorithm process, and on the other hand, the super pixel block can more effectively reflect the texture features than a single pixel.

In other embodiments, the SEEDS algorithm may alternatively be used to abstract and segment the original image into logical pixels that are feature-consistent.

In s3, the corresponding texture features of labeled areas in the original image are selected to train a prediction algorithm.

In s4, unlabeled areas are predicted using the trained prediction algorithm, and a labeled diagram is created according to the predicted texture feature distribution.

By selecting the labeled areas to train the prediction algorithm and predicting the unlabeled areas using the prediction algorithm, the texture synthesis method according to the present disclosure can selectively set the seed points (selected positions) in the original image to extract the texture features. Thus, using the prediction algorithm in connection with the texture rules in the seed points can help to quickly complete the classification and labeling of the unlabeled areas of the original image.

In this embodiment, a random forest algorithm may be used as the prediction algorithm. As a combination of a set of decision trees, random forests have high classification accuracy for texture features, are fast and stable, and provide strong predictable results. They can process high-dimensional data without needing to perform feature selection. It has great advantages over other algorithms in the context of current texture image processing.

Figure 6:
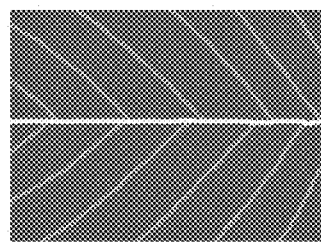
FIG. 6 shows a labeled diagram generated according to FIG. 5.
Figure 11:
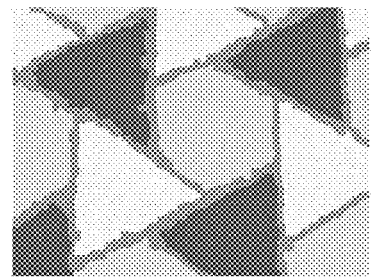
FIG. 11 shows a labeled diagram generated according to FIG. 9.

After the trained random forest algorithm predicts the unlabeled areas and records the confidence $P(l_p|f_p)$ of each super pixel p belonging to the label $l_p$, the classification results are optimized using the Graph cut model, such that the labeled diagram for the current time would be generated (as illustrated in FIG. 6 and FIG. 11).

In s5, a determination is performed as to whether the texture feature distribution of the labeled diagram is accurate. If it is accurate, step s6 would be performed. Otherwise if it is not accurate, the method would return to step s3.

In particular, the meaning of the labeled diagram consists in that it can better describe the distribution of different material textures in the texture image (as illustrated in FIG. 6 and FIG. 11, where the labeled diagram connects different colors or labels with different material textures in the original image, and the associations can be intuitively shown). The computer system can accurately identify the distribution of the material textures in the original image according to the information of the labeled diagram, thereby facilitating the classification and application of the material textures, such as filling, blurring, texture transformation, and the like. The object of the present disclosure is to control the process of texture synthesis based on the labeled diagram, so the quality of the generated labeled diagram directly determines the effect of the final texture synthesis.

The determination by step s5 realizes the interaction with the generation of the labeled diagram, namely the determination of the accuracy of the generated labeled diagram, so that the labeled diagram is in a controlled state. Which is further combined with such further iterative steps as repetitive classification and discrimination on the existing basis, the accuracy of texture feature distribution of the labeled diagram can be further improved, so that the final generated labeled diagram can satisfy the user's requirements. In this embodiment, the comparison of the accuracy of the labeled diagram is implemented as computer-implemented automatic comparison and determination based on texture feature analysis. In other embodiments, manual intervention may alternatively be adopted. That is, a staff member compares the labeled diagram and the original image for their difference, thereby further determining whether to perform the iteration (i.e., classification and optimization on the existing basis) to regenerate the labeled diagram or to use this labeled diagram for the subsequent texture synthesis.

In s6, a target texture image is obtained by synthesizing with a preset target labeled diagram based on the labeled diagram.

Figure 7:
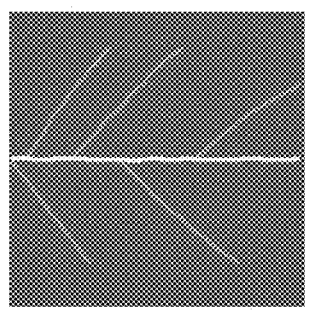
FIG. 7 is a target labeled diagram that is input when performing the texture synthesis method in accordance with the present disclosure.
Figure 8:
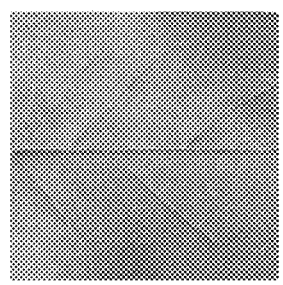
FIG. 8 illustrates a target texture image that is synthesized based on FIG. 6 under the guidance of FIG. 7.
Figure 12:
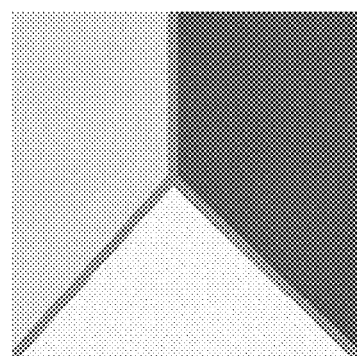
FIG. 12 is a target labeled diagram that is input when performing the texture synthesis method in accordance with the present disclosure.
Figure 14:
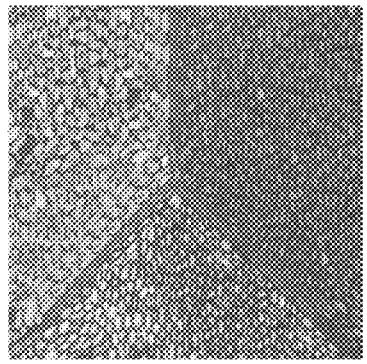
FIG. 14 illustrates a target texture image that is synthesized based on FIG. 11 under the guidance of FIG. 12.

In the synthesizing step, the target labeled diagram (as illustrated in FIG. 7 or FIG. 12) includes type expectation information and structure information of the texture feature distribution of the synthetic target. Thus, the labeled diagram and the target labeled diagram are based to fill the material textures corresponding to the texture features in the corresponding areas, thereby finally synthesizing the target texture image (as illustrated in FIG. 8 or FIG. 14). The use of the target labeled diagram further enhances the control of texture synthesis, so that the target texture image can better meet the user's synthetic expectations, thereby better meeting the user's needs.

Figure 2:
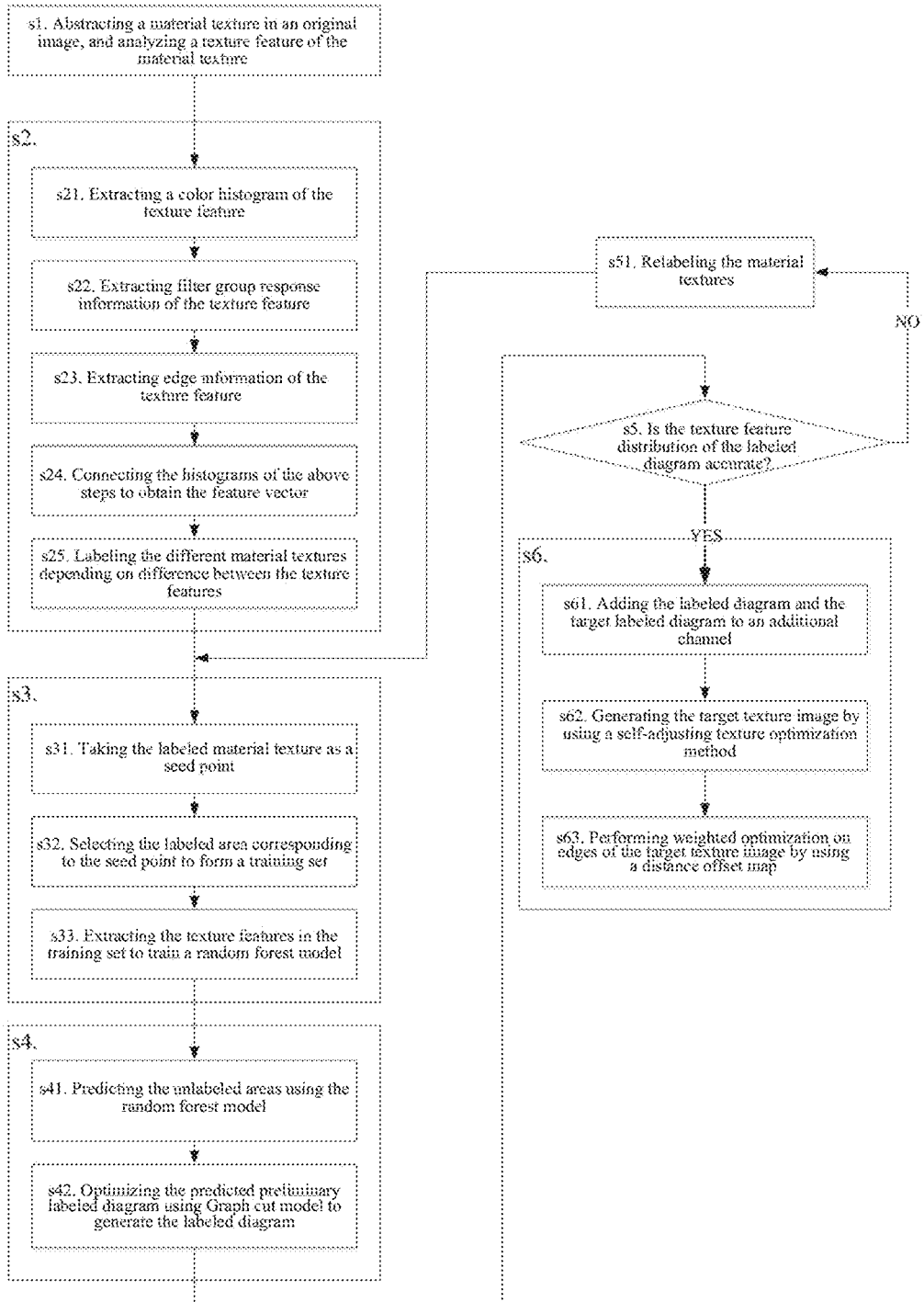
FIG. 2 is a flow chart illustrating complete steps of the texture synthesis method in accordance with the present disclosure.
Figure 3:
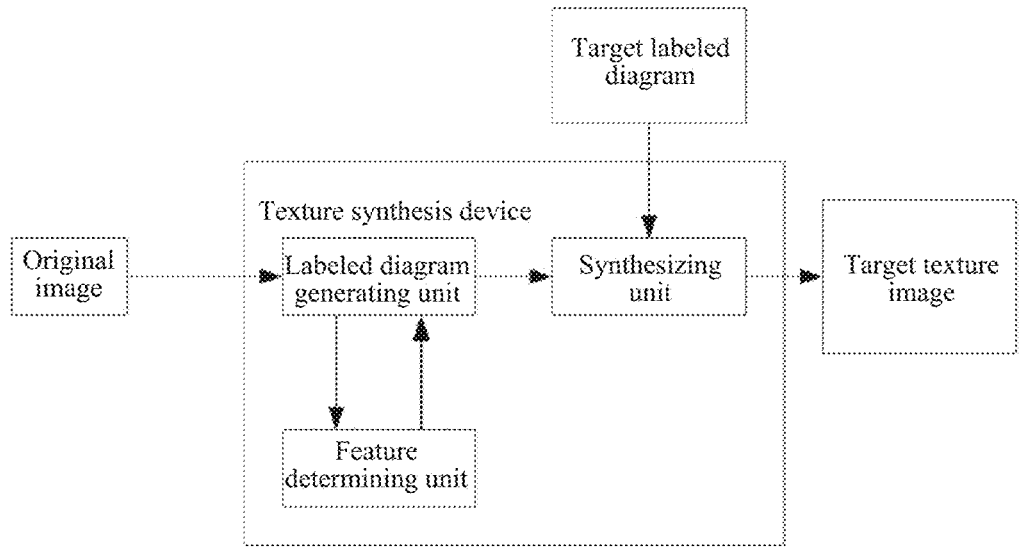
FIG. 3 is a block diagram illustrating a basic configuration of a texture synthesis device in accordance with the present disclosure.

As illustrated in FIG. 2, in an exemplary embodiment, step s21 specifically includes the following steps from s21 to s25.

In s21, a color histogram of each area is extracted, represented by a histogram.

In s22, filter group response information of each area is extracted, represented by a histogram.

In s23, edge information of each area is extracted, represented by a histogram.

In s24, the histograms of the above steps are connected to obtain the feature vector.

In s25, the different material textures are labeled depending on the difference between the texture features.

Extracting the feature vectors of the above types helps the computer system to recognize, analyze, and edit the texture features, improving the accuracy of texture data processing.

In particular, in the interactive iterative segmentation method of the present disclosure, the texture features extracted from each super pixel block (logical pixel) of the texture image include the following three types of features so that the computer can recognize the material textures: a color histogram, filter group response information, and edge information.

For the color histogram, the color values of an image are the most basic information of the image. The color histogram can describe the proportions of different colors in the whole image, without caring about the spatial positions of each color, so it is particularly suitable for describing the images that are difficult to be automatically segmented.

For the filter group response information, it is obtained using MR8 filter group. The MR8 filter group includes both isotropic and anisotropic filters, which overcomes the shortcomings of the traditional rotation invariant filter that the filter group has a weak response in responding to the informational image. Furthermore, the MR8 filter group has only an 8-dimensional response dimension, thereby greatly reducing the complexity of data processing.

For the edge information, it is obtained using gPb detector. The gPb detector takes into account image brightness, texture and color information, combined with local and global image information, so it is a high performance contour detector. In addition, it takes the edge detection as a pixel classification problem, and trains the classifier from the natural images with artificially labeled boundaries (i.e., prediction algorithm, such as random forests), thereby weakening the relatively shorter noise edges to get longer and more pronounced (greater grayscale values) image boundaries.

The above three types of features are represented by histograms, and the three histograms are finally connected into one long vector as the final feature vector of each super pixel block.

In an exemplary embodiment, step s3 further includes the following steps s31 to s33.

In s31, the labeled material texture is used as a seed point. By selecting the seed point, the subsequently generated labeled diagram can more accurately reflect the distribution information of the texture features, thereby improving the controllability of the texture synthesis.

In s32, the labeled area corresponding to the seed point is selected to form a training set.

In s33, the texture features in the training set is extracted to train a random forest model.

Exemplarily, step s4 may include the following steps s41 and s42.

In S41, the unlabeled areas are predicted using the random forest model.

In s42, the predicted preliminary labeled diagram is optimized using Graph cut model thus generating the labeled diagram.

Based on the above three feature vectors, the super pixel blocks having been labeled (labeled areas) are selected to train the classifier (prediction algorithm), where the classifier is exemplarily a random forest integrated learning method; this prediction algorithm is mature and reliable. Finally, the classifier is used to classify other unselected super pixel blocks.

In particular, after the random forest classification is finished, the classification result is optimized by using the Graph Cut algorithm, where the energy function is as follows:

$$E = \sum_p D_p(l_p) + \lambda \sum_{\{p,q\} \in N} w_{pq} \cdot V_{pq}(l_p, l_q) \tag{1}$$

where in the data term $D_p(l_p)=1-P(l_p|f_p)$, $P(l_p|f_p)$ represents the probability (confidence) that the superpixel p is classified as $l_p$, and the smoothing term $V_{pq}(l_p, l_q)=D_{EMD}(f_p, f_q)$ denotes the costs when adjacent superpixels are given different labels, where super-pixels p and q are used corresponding to the EMD (Earth Movers' Distance) distance of the feature vector. In this disclosure, $\lambda=1$ was set in all experiments. The weight coefficient $w_{pq}$ is related to the adjoining side length between the superpixels, and the formula is selected as follows:

$$w_{pq} = \begin{cases} 0, & \text{if } L_{adj}(p, q) < a \\ 1, & \text{else} \end{cases} \tag{2}$$

where $L_{adj}(p, q)$ represents the number of pixels adjacent to the adjacent superpixels p and q. The threshold a =10 is set in this embodiment.

In other embodiments, the prediction algorithm may also be trained using a Gradient Boost Decision Tree to predict (classify) the unselected areas. Furthermore, more types of features can be extracted and added into the final feature vector.

As illustrated in FIG. 1, step s5 may further include the following step s51.

In s51, in response to determining that the texture feature distribution of the labeled diagram is inaccurate, the material textures are relabeled and the method returns to step s3.

This step can edit or adjust the result obtained in step s5. When the result of step s4 is inaccurate, it may mean that the labeling of the material textures in step s25 is inaccurate, so relabeling can effectively correct the problem.

In an exemplary embodiment, the target labeled diagram in step s6 includes the texture distribution information of the target texture image.

The step s6 may include the following steps s61 and s62.

In s61, the labeled diagram and the target labeled diagram are added to an additional channel.

In s62, the target texture image is generated by using a self-adjusting texture optimization method.

In the actual operation, based on the self-adjusting texture optimization method, the labeled diagram is added as an additional channel to the synthesis of the texture image, and the difference between the labeled diagram and the target labeled diagram is calculated as an additional penalty term to be added to the texture optimization; the specific process is as follows.

Texture optimization (first proposed by Kwatra et al.) targets at the similarity between the target map T and the sample map S by minimizing the distance between all corresponding overlapping local patches of the target map and the sample map, as follows:

$$\min_{\{t_i, s_i\}} \sum_{i \in T} d(t_i, s_i) \tag{3}$$

where $t_i$ denotes an N*N size block in the target image T, the upper left corner of the block corresponds to the i-th pixel of the texture, and $s_i$ is the block in the sample S that is most similar to $t_i$. In the program N is set N=10. The distance between the blocks is the sum of the squares of the differences in color values.

$$d(t_i, s_i) = \|t_i - s_i\|_2^2 \tag{4}$$

The distance metric of the above formula is modified as follows. The labeled diagram $L^S$ corresponding to the original image is given, and the distance metric is modified to match the target labeled diagram $L^T$ for the purpose of constraining the texture synthesis.

$$d(t_i, s_i) = \|t_i - s_i\|_2^2 + \lambda C \sum_{x \in s_i, y \in t_i} B(L_x^S, L_y^T) \tag{5}$$

The first term of the formula is the sum of the squares of the differences in color values. The second part is a penalty term, which measures the difference between the labeled diagram $L^S$ corresponding to the source image and the target labeled diagram $L^T$ regarding the corresponding local blocks. $\lambda$ is used to adjust the weight between the color and the penalty term, where all experiments in the present disclosure take $\lambda=0.9$; C is a constant, and is set to C=100 in this disclosure. B(x, y) is a binary function, which takes 0 only when $L_x^S=L_y^T$, otherwise the function takes 1.

In an exemplary embodiment, step s6 further includes the following step s63.

In s63, weighted optimization is performed on edges of the target texture image by using a distance offset map.

In actual operation, the advantages of the discrete labeled diagrams are clearness and intuitiveness. However, for some textures like weathering textures, rusting textures, and the like, there are no very precise edges between different materials or different weathering degrees of the same material, while the labeled diagrams derived from segmentation have precise edges. In view of this contradiction, for the texture image having a gradual transition, in synthesizing the target texture image the present disclosure uses a distance offset map to perform weighted optimization at the edges thus reducing the weight of the penalty term near the boundaries, thereby achieving the purpose of reducing the control near the control boundaries.

First, the boundaries of the original image and the generated labeled diagram are extracted as feature lines. Then a distance transform map is then generated based on the feature lines. Finally, the "continuous" grayscale image obtained by the distance transformation is added to the synthetic control as the weight map of the constraint term. At this point, the new distance metric is defined as follows:

$$d(t_i, s_i) = \|t_i - s_i\|_2^2 + \lambda C \sum_{x \in s_i, y \in t_i} \frac{(w_x^S + w_y^T)}{2} * B(L_x^S, L_y^T) \qquad (6)$$

Where $w_x^s$ and $w_y^T$ are the source weight and the target weight, respectively. Therefore, when image blocks $t_i$ and $s_i$ are located near the boundary, $w^T$ and $w^S$ will become very small and would approximately equal 0 on the boundary. As such, the penalty term will become very small, so that the constraint will be greatly reduced, and the blocks at the boundaries of the target image are more likely to look for pixel blocks of a uniform color from the gradually changing area near the boundary of the source image. Therefore, the synthesis would be closer to the original image thus becoming more natural.

Figure 10:
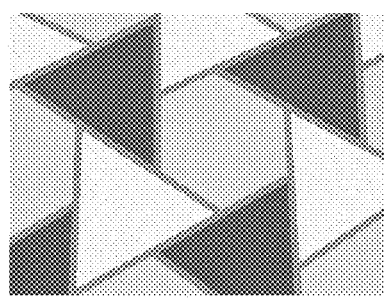
FIG. 10 shows a hand-drawn labeled diagram.
Figure 13:
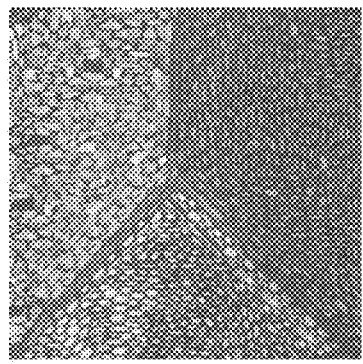
FIG. 13 illustrates a target texture image that is synthesized based on FIG. 10 under the guidance of FIG. 12.

FIGS. 9 to 14 shows comparisons between the labeled diagrams generated by the method of the present disclosure and the labeled diagram that are manually labeled, as well as the corresponding guided synthesis results. Compared with manual labeling, the method according to the present disclosure is simpler and more efficient. FIG. 10 is a hand-drawn labeled diagram by a user using an existing software tool Photoshop, which takes about 10 minutes. FIG. 11 is a labeled diagram generated by the aforementioned interactive iterative segmentation algorithm, which is edited by a total of 5 iterations, taking about 3 minutes. From the classification results, the labeled diagram (FIG. 11) generated by the method according to the present disclosure is close to the manually labeled diagram (FIG. 10). More importantly, it is finally possible to synthesize very desirable results, as illustrated in FIGS. 12 and 13.

As can be seen, the method regarding producing a labeled diagram in the texture synthesis method according to the present disclosure can generate a label map in a simple and efficient manner. Furthermore, the interactive iterative image segmentation method avoids the shortcomings that the determination of the suitability of the textures needs a large database support. This method is more suitable for the user to quickly and accurately obtain the labeled diagram, and even for complex texture images, the labeled diagram can be generated efficiently and intuitively.

Meanwhile, regarding the edge gradient (such as weathering, rust, etc.) textures, the present disclosure reduces the weight of the penalty item near the boundaries to achieve the purpose of edge gradient texture control.

Further, the application of the texture synthesis technology according to the present disclosure is convenient to expand, and can be applied to scenarios such as image repair, background reconstruction, and 3D model texture synthesis by simply replacing the target labeled diagram.

To solve the above technical problem, the present disclosure further provides a texture synthesis device, including a labeled diagram generating unit, a feature determining unit, and synthesizing unit.

The labeled diagram generating unit is configured to abstract and analyze an input original image to extract a feature vector of a texture feature, separately label different material textures, select the texture features of labeled areas to train a prediction algorithm and predict unlabeled areas, and finally create a labeled diagram according to the texture feature distribution.

The feature determining unit is coupled to the labeled diagram generating unit and is configured to determine whether the texture feature distribution of the labeled diagram is accurate. If it is not accurate, the material textures are relabeled and the labeled diagram generating unit is activated to retrain the prediction algorithm to generate the labeled diagram.

The synthesizing unit is coupled to the labeled diagram generating unit and is configured to synthesize the labeled diagram with a preset target labeled diagram based on the labeled diagram to obtain a target texture image.

Figure 4:
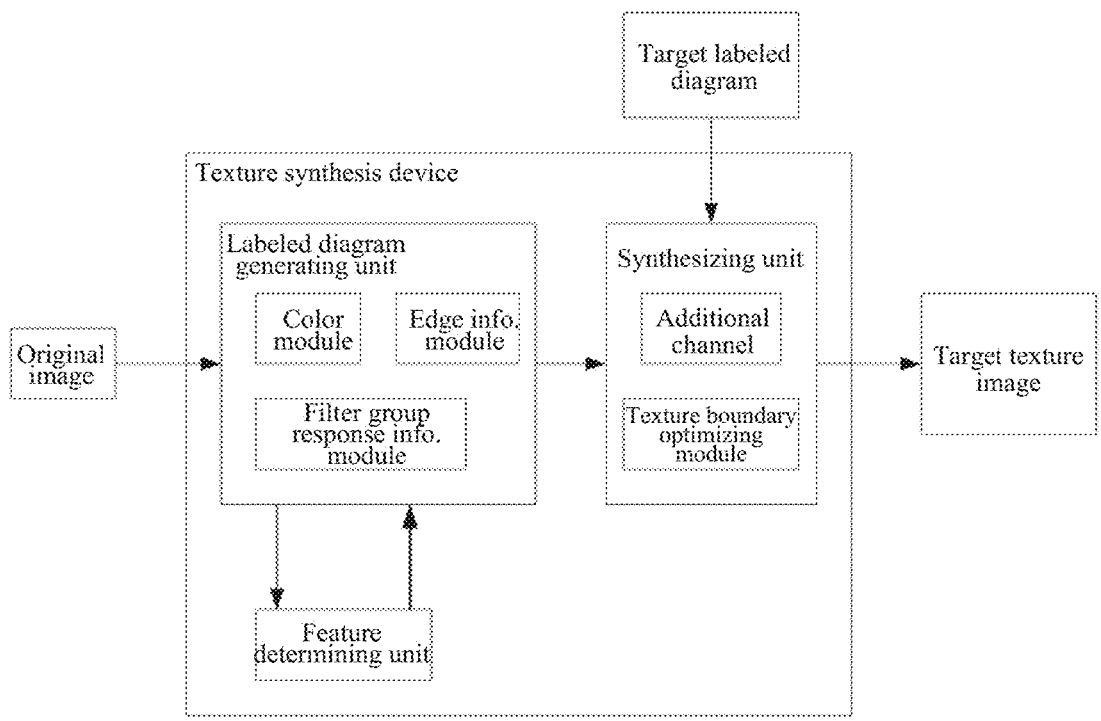
FIG. 4 is a block diagram illustrating a complete configuration of the texture synthesis device in accordance with the present disclosure.

As illustrated in FIG. 4, in the texture synthesis device, the labeled diagram generating unit specifically includes the following feature extracting modules, including a color module, a filter group response information module, and an edge information module.

The color module is configured to extract a color histogram of the area, the color histogram being represented by a histogram.

The filter group response information module is configured to extract filter group response information of the area, the filter group response information being represented by a histogram.

The edge information module is configured to extract edge information of the area, the edge information being represented by a histogram.

The synthesizing unit may include:
an additional channel configured to load the labeled diagram and the target labeled diagram; and
a texture boundary optimizing module configured to separately extract a distance offset map according to each of the label map and the target label map, and perform weighted optimization on the edges of the target texture image according to the extracted distance offset maps.

Different from the related art, the present adopts the labeled diagram of the original image to guide the process of texture synthesis. Because the process of generating the labeled diagram is controllable, the texture synthesis is also in a controlled state, which effectively improves the accuracy and efficiency of the computer in processing complex texture information such as textures composed of multiple materials or textures that involve non-uniform gradients. Meanwhile, determination of the accuracy of the texture features of the labeled diagram is introduced to the process of producing the labeled diagram, and the labeled diagram with low accuracy is re-abstracted and -segmented so that the classification of the texture features would be more accurate. This interactive iterative method improves the controllability of the labeled diagram generation process, enabling the final generated texture synthetic image to meet the user's requirements, thereby achieving the purpose of accurately controlling the sample-based texture synthesis.

The foregoing merely describes some illustrative embodiments in line with the present disclosure, and is not intended to be limiting the patentable scope of the present disclosure. Therefore, any equivalent structural or flow changes made based on the specification and drawings of the present disclosure, or any direct or indirect application of the present disclosure in other related technical fields shall by the same token fall in the scope of protection of the present disclosure.

What is claimed is:
1. A texture synthesis method, comprising:
  s1. abstracting a material texture in an original image, and analyzing a texture feature of the material texture;
  s2. extracting a feature vector of the texture feature, and separately labeling different material textures;

s3. selecting corresponding texture features of labeled areas in the original image to train a prediction algorithm;

s4. predicting unlabeled areas in the original image using the trained prediction algorithm, and creating a labeled diagram according to predicted texture feature distribution;

s5. determining whether the texture feature distribution of the labeled diagram is accurate, and in response to determining that the texture feature distribution is accurate, performing step s6; in response to determining that the texture feature distribution is inaccurate, returning to step s3; and s6. synthesizing with a preset target labeled diagram based on the labeled diagram to obtain a target texture image.

2. The texture synthesis method of claim 1, wherein step s2 comprises:

s21. extracting a color histogram of the texture feature, represented by a histogram;

s22. extracting filter group response information of the texture feature, represented by a histogram;

s23. extracting edge information of the texture feature, represented by a histogram;

s24. connecting the histograms of the above steps to obtain the feature vector; and s25. labeling the different material textures depending on difference between the texture features.

3. The texture synthesis method of claim 2, wherein step s3 comprises:

s31. taking the labeled material texture as a seed point;

s32. selecting the labeled area corresponding to the seed point to form a training set; and s33. extracting the texture features in the training set to train a random forest model.

4. The texture synthesis method of claim 3, wherein step s4 comprises:

s41. predicting the unlabeled areas using the random forest model; and s42. optimizing the predicted preliminary labeled diagram using Graph cut model to generate the labeled diagram.

5. The texture synthesis method of claim 4, wherein step s5 comprises:

s51. in response to determining that the texture feature distribution of the labeled diagram is inaccurate, relabeling the material textures and returning to step s3.

6. The texture synthesis method of claim 1, wherein the target labeled diagram in step s6 comprises the texture distribution information of the target texture image.

7. The texture synthesis method of claim 6, wherein step s6 comprises:

s61. adding the labeled diagram and the target labeled diagram to an additional channel; and s62. generating the target texture image by using a self-adjusting texture optimization method.

8. The texture synthesis method of claim 7, wherein step s6 further comprises:

s63. performing weighted optimization on edges of the target texture image by using a distance offset map.

9. A texture synthesis device, comprising:

a labeled diagram generating unit, configured to abstract and analyze an input original image to extract a feature vector of a texture feature, separately label different material textures, select the texture features of labeled areas to train a prediction algorithm and predict unlabeled areas, and finally create a labeled diagram according to the texture feature distribution;

a feature determining unit, coupled to the labeled diagram generating unit and configured to determine whether the texture feature distribution of the labeled diagram is accurate; in response to determining the texture feature distribution is inaccurate, the material textures are relabeled and the labeled diagram generating unit is activated to retrain the prediction algorithm to generate the labeled diagram; and a synthesizing unit, coupled to the labeled diagram generating unit and configured to synthesize the labeled diagram with a preset target labeled diagram based on the labeled diagram to obtain a target texture image.

10. The texture synthesis device of claim 9, wherein the labeled diagram generating unit comprises:

a color module, configured to extract a color histogram of the area, the color histogram being represented by a histogram;

a filter group response information module, configured to extract filter group response information of the area, the filter group response information being represented by a histogram; and an edge information module, configured to extract edge information of the area, the edge information being represented by a histogram;

wherein the synthesizing unit comprises:

an additional channel, configured to load the labeled diagram and the target labeled diagram; and a texture boundary optimizing module, configured to separately extract a distance offset map according to each of the label map and the target label map, and perform weighted optimization on edges of the target texture image according to the extracted distance offset maps.

* * * * *